United States Patent [19]

Garbo et al.

[11] Patent Number: 5,363,311
[45] Date of Patent: Nov. 8, 1994

[54] DATA COMPRESSION SYSTEM USING RESPONSE WAVEFORM DISCRIMINATION

[75] Inventors: Martin J. Garbo, Littleton; Bruce T. Firtha, Aurora, both of Colo.

[73] Assignee: Hughes Aircraft Company, Los Angeles, Calif.

[21] Appl. No.: 941,010

[22] Filed: Sep. 4, 1992

[51] Int. Cl.$^5$ ............................................. G06F 15/20
[52] U.S. Cl. ............................ 364/481; 364/487; 327/72; 327/94
[58] Field of Search ............... 364/481, 480, 482, 479, 364/487, 574, 550; 255/156, 152; 307/351; 375/10, 103, 14, 27

[56] References Cited

U.S. PATENT DOCUMENTS

| | | | |
|---|---|---|---|
| 3,881,097 | 4/1975 | Lehmann | 235/156 |
| 4,065,664 | 12/1977 | Kristof et al. | 364/487 |
| 4,802,098 | 1/1989 | Hansen et al. | 364/487 |
| 4,858,153 | 8/1989 | Ziegler et al. | 364/550 |
| 5,001,419 | 3/1991 | Miller | 364/577 |
| 5,166,954 | 11/1992 | Grizmala et al. | 375/10 |
| 5,170,359 | 12/1992 | Sax et al. | 364/481 |

*Primary Examiner*—Kevin J. Teska
*Assistant Examiner*—Jacques Harold Louis-Jacques
*Attorney, Agent, or Firm*—Gordon R. Lindeen, III; William J. Streeter; Wanda K. Denson-Low

[57] ABSTRACT

A waveform classification system uses a detector 10 for detecting an analog input x(t), as well as sampler 14 and quantizer 16 to convert this analog input into a series of digital values $\{J_{k-1}, J_k, J_{k+1}\}$. This series of digital values $\{J_{k-1}, J_k, J_{k+1}\}$ is represented by a fixed number of quantized digital values. A collection of predetermined feasible values is held in a feasible set table 20. A waveform classifier 18 compares the digital series from the quantizer 16 to the predetermined series held in the feasible set table 20. The waveform classifier 18 has an output, $f(Z_k)$, that marks the data in the digital series as either high or low interest. Low interest data can either be eliminated or reduced in priority to improve the overall system performance.

15 Claims, 2 Drawing Sheets

DATA COMPRESSION SYSTEM USING RESPONSE WAVEFORM DISCRIMINATION

BACKGROUND OF THE INVENTION

1. Technical Field

The present invention relates to waveform discrimination in general, and more particularly waveform discrimination techniques used to perform data compression.

2. Discussion

Data detection and compression circuits typically employ detector elements for converting analog responses to digital signals. These digital signals are then analyzed by some type of digital processing circuitry. The detection of peaks in the waveform can be performed by a threshold detector circuit. The only parameter normally considered by the threshold detector is the magnitude of the response signal. However, the detector will respond differently to different inputs in ways other than simple magnitude variances. If a response to a particular type of input signal is sought, then additional information besides signal magnitude is beneficial. It would be advantageous to reduce the amount of data that needs to be extensively processed by using additional signal information to determine the presence of a signal of interest. By analyzing the rates at which the waveforms rise and fall, and other signal specific information, signals of non-interest can be immediately disregarded, reducing the use of valuable computational resources. It does not appear that the prior art has proposed a solution to this problem with the simplicity of the present invention.

SUMMARY OF THE INVENTION

In accordance with the teachings of the present invention, a data compression system uses a signal processor for detecting analog input and quantizing this analog input to produce a series of digital values. This digital series is represented by a fixed number of quantized digital values. A second digital series holds a collection of predetermined feasible values in a storage means. A waveform classifier device compares the digital series from the signal processor to the collection of predetermined series held in memory. The waveform classifier produces an output that marks the data in the digital series as either high or low interest. Low interest data can either be eliminated or reduced in priority to improve the overall system performance. The low interest data can be processed in different ways allowing the present invention to be adapted to a wide variety of applications.

In the preferred embodiment of the present invention, a waveform classifier is used in conjunction with a filter, a sampler, and a quantizer to consider various distinguishing characteristics of a detector response in addition to the signal magnitude. The filter is designed to maximize the ratio of signals of interest to interfering noise plus background. The waveform classifier reduces the amount of data that needs to be extensively processed by determining signals of interest. Only data with features indicative of the target signal are allowed further processing. The waveform classifier compares a triplet, which consists of a set of three consecutive quantized values, to a predetermined acceptable set of three consecutive quantized values. The amount of data that needs to be processed can be significantly reduced by eliminating target signals that are obviously of non-interest, thus requiring a minimum use of computational resources.

BRIEF DESCRIPTION OF THE DRAWINGS

The various advantages of the present invention will become apparent to those skilled in the art after studying this specification and by referencing the drawings in which.

DESCRIPTION OF THE PREFERRED EMBODIMENTS

It should be understood from the outset that the present invention will be described in connection with a few limited examples which illustrate the best mode of practicing the invention at the time this application was filed. However, various modifications will become apparent to those skilled in the art after having the benefit of studying the text, drawings and claims which follow this detailed specification. With that in mind the attention of the reader should now be turned to the drawings, especially FIG. 1.

Figure 1:
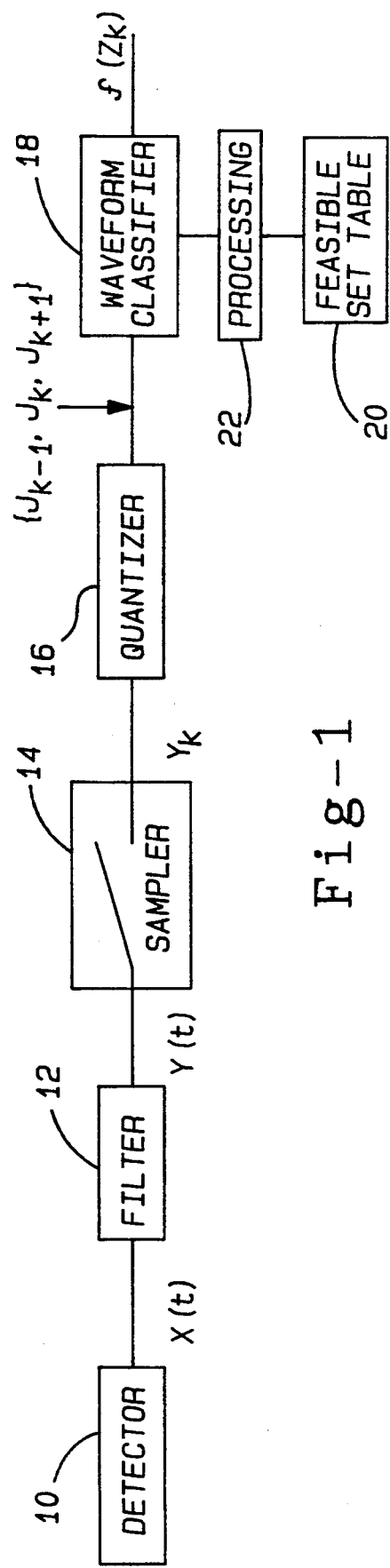
FIG. 1 is a signal detection data flow diagram of the invention.

FIG. 1 illustrates a signal detection data flow diagram. In accordance with the preferred teachings of this invention, a detector 10 is used to detect when a response occurs and converts the response to a continuous signal.

Figure 2:
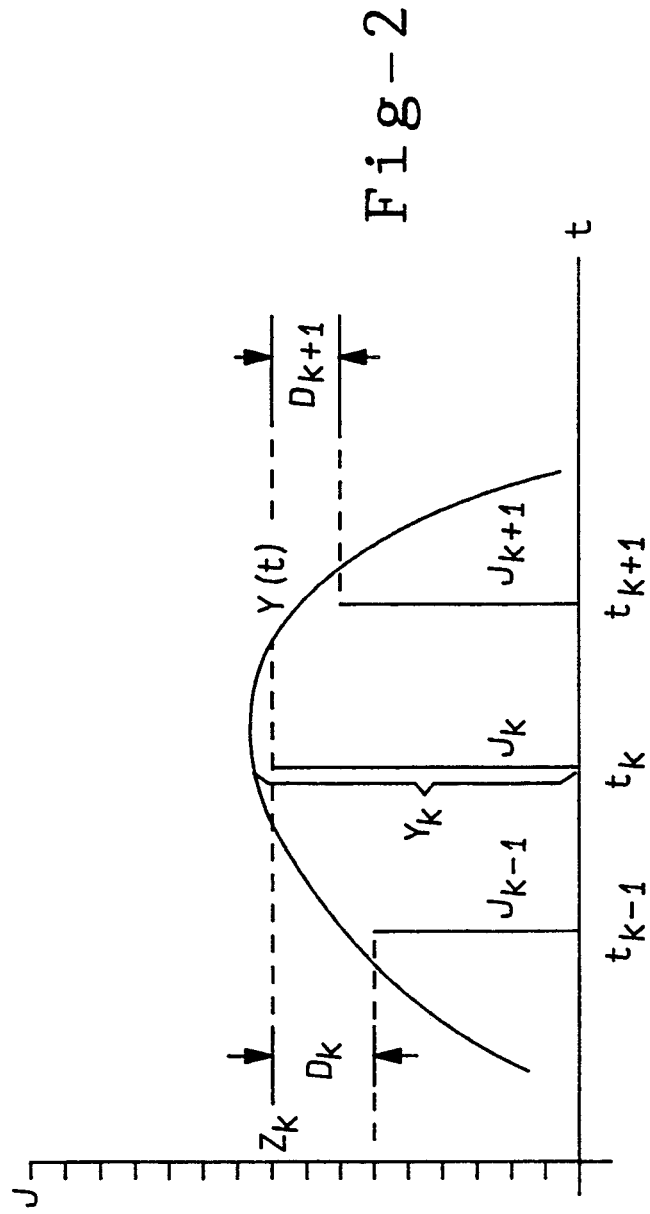
FIG. 2 is a graph of the peak detection scheme used by the waveform classifier.

Detector 10 has an output response X(t). This detector response X(t) includes signals of interest as well as interfering noise and background signals. A filter 12 is designed to maximize the ratio of signals of interest to interfering noise plus background signals. The filter 12 has an output response Y(t). The detector response X(t) and the filter response Y(t) are both continuous signals. A sampler 14 is used to sample the filter response Y(t), converting filter response Y(t) to the digital sampled response $Y_k$. The sampler 14 uses a sampling period T, that should be chosen appropriately to accommodate the detection and estimation of peaks in the input. The waveform shown in FIG. 2 illustrate a properly chosen sampling period T. The values $t_{k-1}$, $t_k$, and $t_{k+1}$ on the abscissa correspond to the sampled values $Y_{k-1}$, $Y_k$, and $Y_{k+1}$ on the ordinate. The sampled response $Y_k$ is then processed by a quantizer 16 producing a quantized response $J_k$. The set of quantized responses $\{J_{k-1}, J_k, J_{k+1}\}$ is then processed by a waveform classifier 18.

FIG. 2 graphically illustrates a peak detection scheme used by the waveform classifier 18 to produce an output $Z_K$. The change in magnitude from one quantized value to the next is defined as delta, or $D_k$. The delta value can have either a positive or negative sign depending on the order of the quantized response values. $D_k$ is defined by the equation:

$$D_k = J_k - J_{k-1}$$

A negative $D_k$ will occur when $J_{k-1}$ is greater than $J_k$. A peak is detected at time, $t_k$, if $$J_{k-1} \leq J_k \text{ and } J_k > J_{k+1}$$

Additionally, the magnitude, $Z_k$, of this peak is $$Z_k = J_k$$

The waveform classifier 18 operates by collecting a set of three consecutive quantized responses, $J_k$, from the quantizer 16. This collected triplet, $\{J_{k-1}, J_k, J_{k+1}\}$, is compared to the set of triplets that could have resulted from the signal of interest. The set of triplets that could have resulted from the signal of interest are stored in the feasible set table 20. This collection of digital series is predetermined and can be changed or manipulated as desired. It should be appreciated, since the response data has been quantized, there are a finite number of values available to represent the response data. The values in the feasible set table 20 can be pre-computed and stored in computer memory. If the collected triplet is not a feasible triplet, then the response data is classified and tagged as low interest. If the collected triplet is a feasible triplet, the data represents a signal of interest and is further processed.

Figure 3:
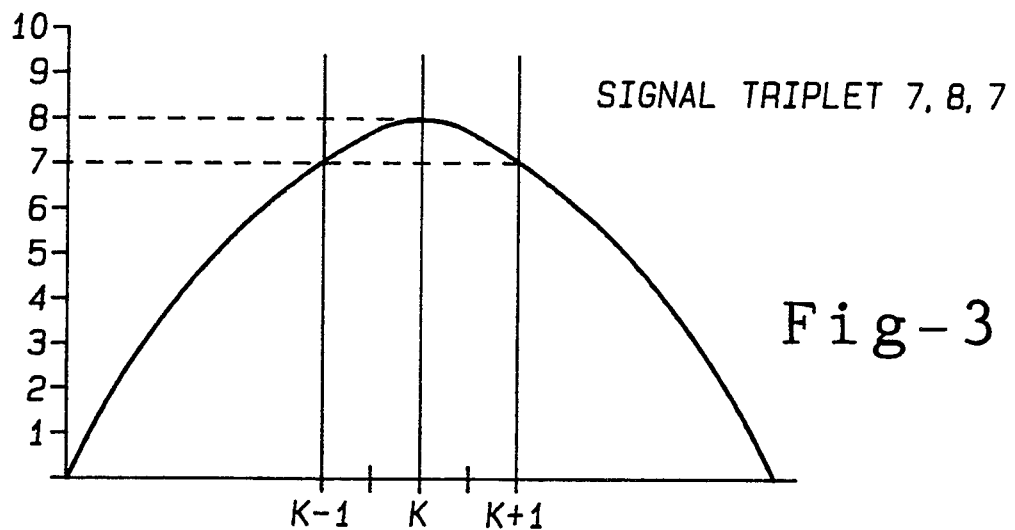
FIG. 3 is a graph of a signal of interest.
Figure 4:
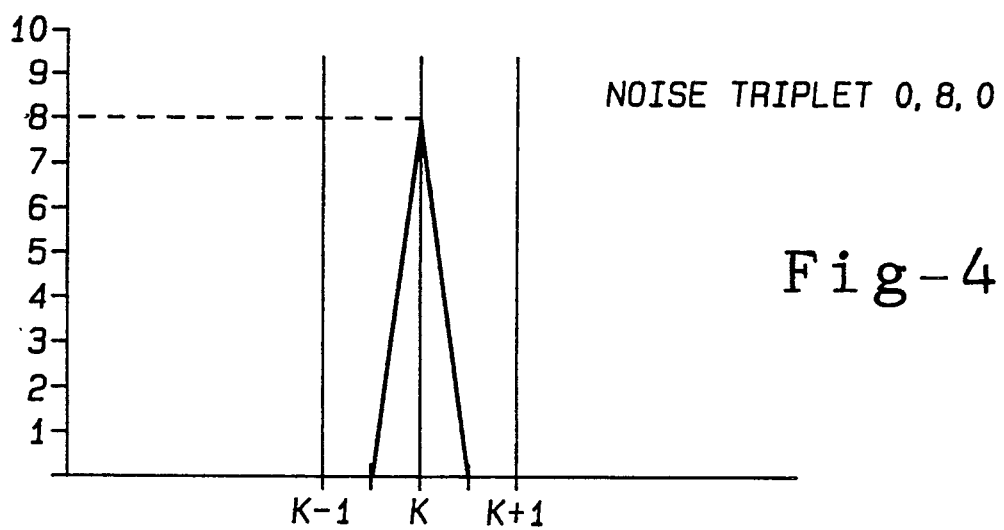
FIG. 4 is a graph of a noise signal.
Figure 5:
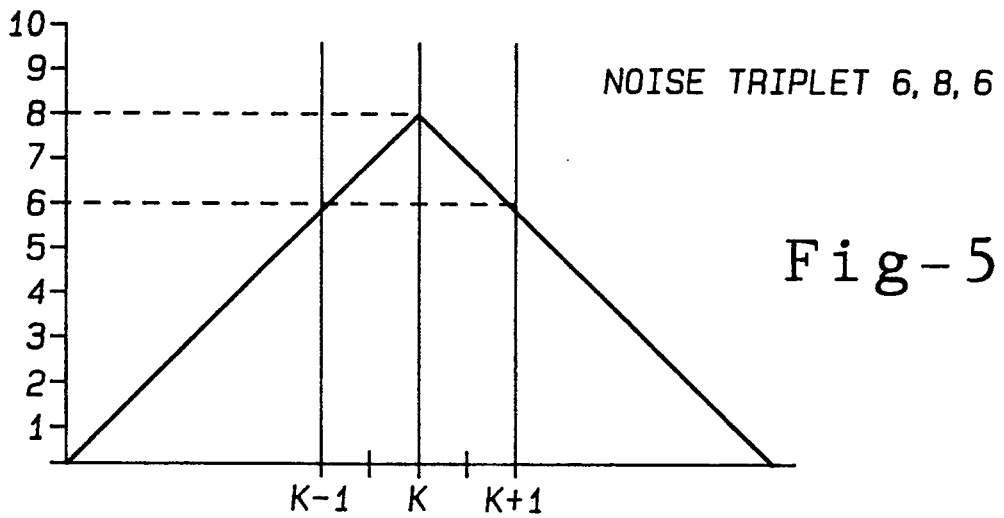
FIG. 5 is a graph of a noise signal.

FIGS. 3-5 illustrate three separate waveforms passing through the waveform classifier 18. In each figure the quantized peak magnitudes, $Z_k$, are equal to 8. In FIG. 3 the collected triplet is defined as {7, 8, 7}. This collected triplet is defined by the intersection of the vertical lines K−1, K, and K+1 with the waveform. These points of intersection are referenced to the ordinate as shown by the dotted lines in FIG. 3. In this example, the collected triplet {7, 8, 7} is stored in the feasible set table 20. Therefore, the waveform illustrated in FIG. 3 is a high interest waveform and is tagged as such.

FIG. 4 illustrates an example of a noise triplet. The collected triplet, obtained similarly to the collected triplet in FIG. 3, is defined as {0, 8, 0}. The collected triplet {0, 8, 0} is not found in the feasible set table 20. Therefore, the signal is not considered a signal of interest and is tagged as low interest.

FIG. 5 illustrates a second example of a noise waveform. The collected triplet, obtained similarly to the examples in FIGS. 3 and 4, is defined as {6, 8, 6}. This collected triplet {6, 8, 6} is not found in the feasible set table 20. Therefore, the signal is considered low interest and is tagged as such.

In the previous examples, it should be appreciated that the signal triplet {7, 8, 7} is located in the feasible set table 20 by design. Any values may be included or excluded from the feasible set table 20. Additionally, the feasible set table 20 can be changed to provide flexibility in classifying various types of waveforms. The values held in the feasible set table 20, should be chosen to include waveforms of particular interest, while excluding waveforms of obvious non-interest.

In addition to classifying data as interest or non-interest, the amount of data that requires further processing can be reduced. The data that is low interest can be deffered to a secondary processor, reduced in priority on a main processor, or completely discarded. If the low interest data is completely discarded, the invention is being used as a data compression system. The waveform classifier can be implemented in digital hardware or software. The hardware implementation can classify data at much higher rates than the software implementation.

The waveform classifier 18 in conjunction with the feasible set table 20 provides a detection device that can be programmed in a variety of ways to be responsive to specific types of input signals. By changing the values held in the feasible set table 20, the output response, $f(Z_k)$, a function of $Z_k$'s, can be formed in a limitless number of ways.

The feasible set table 20 can be manipulated by a processing block 22. This processing block 22 can be programmed to perform many mathematical functions on the collection of digital series held in the feasible set table 20. For example, processing block 22 can be used as a simple linear gain block to the digital series held in feasible set table 20. In an additional example of adjusting the digital series held in the feasible set table 20, a processing block 22 could provide an amplitude adjustment. Processing block 22 could simply add or subtract a fixed amount from the amplitude of each quantized value held in memory. The amount of such adjustment would preferably be controlled by an external input.

The present invention has many applications in which specific signal detection is required. Military applications could include the detection of a target in the presence of noise and clutter. Medical imagery applications might include the detection of tumors. Polygraph testing requires detecting signals and characteristics of lie responses. The present invention could program such lie response characteristics into the feasible set table 20 to determine precisely when a lie occurs. Weather satellite imagery requires detection of storm center signals. Similar to the polygraph, the storm center signal characteristics could be entered into the feasible set table 20 of the present invention.

The various advantages of the present invention will become apparent to one skilled in the art after a study of the foregoing specification and following claims.

What is claimed is:

1. A waveform classification system comprising:
signal processing means for quantizing an input signal to produce a digital series, said digital series including a fixed number of quantized digital values;
storage means for storing a collection of a predetermined feasible series having a fixed number of digital values representing waveforms of high interest to said waveform classification system, said fixed number of digital values corresponding to said fixed number of quantized values; and
classifier means for comparing said digital series from said signal processing means to the collection of predetermined feasible series in the storage means, with said classifier means generating an output indicating the input signal is of high interest if the digital series is included in the collection of predetermined digital series or an output indicating the input signal is of low interest if the digital series is not included in the collection of predetermined digital series.

2. The waveform classification system according to claim 1, wherein the output of said classifier is used to produce data compression by eliminating signals of low interest.

3. The waveform classification system according to claim 2, wherein said signal processing means includes quantizing means for converting said input signal to one of the values held in a predetermined finite set.

4. The waveform classification system according to claim 3, wherein the resolution of said predetermined finite set is adjusted to classify various types of signals.

5. The waveform classification system according to claim 4, wherein said waveform classifier means includes a means for manipulating said collection of predetermined feasible series to produce derivative feasible series for additional comparisons.

6. The waveform classification system according to claim 5, wherein the length of said digital series and said collection of predetermined feasible series is defined by a fixed number of quantized values.

7. The waveform classification system according to claim 6 wherein said fixed number of quantized values is defined as three.

8. A method of waveform classification comprising the steps of:
   quantizing an input signal to produce a digital series, said digital series including a fixed number of quantized digital values;
   storing a collection of a predetermined feasible series having a fixed number of digital values representing waveforms of high interest, said fixed number of digital values corresponding to said fixed number of quantized values; and
   comparing said digital series to said collection of predetermined feasible series for generating an output indicating if the input signal is of high interest if the digital series is included in the collection of predetermined digital series or an output indicating the input signal is of low interest if the digital series is not included in the collection of predetermined digital series.

9. The method according to claim 8 wherein the step for indicating if the input signal is high or low interest includes compressing the input signal by eliminating signals of low interest.

10. The method according to claim 9 wherein the quantizing step includes converting said input signal to quantized values held in a predetermined finite set.

11. The method according to claim 10 wherein the step for quantizing and converting said input signal includes adjusting the resolution of said predetermined finite set to classify various types of analog signals.

12. The method according to claim 11 wherein the step for comparing said digital series to said collection of predetermined feasible series includes manipulating said collection of predetermined feasible series producing derivative feasible series for additional comparisons.

13. The method according to claim 12 wherein the step for comparing said digital series to said collection of predetermined feasible series includes defining the length of said digital series and predetermined feasible series as a fixed number of quantized values.

14. The method according to claim 13 wherein said fixed number of quantized values is defined as three.

15. A waveform classification system comprising:
   signal processing means for quantizing an input signal to produce a digital series, said digital series including a fixed number of quantized digital values sampled in a sequence having a first, a last, and an intermediate value, said signal processing means including peak detection means for quantizing the input signal in accordance with a peak associated with said input signal, said intermediate value being greater than or equal to said first and second values and defines a peak value for said sequence;
   storage means for storing a collection of a predetermined feasible series of digital values, each of said feasible series of digital values having a first, a last, and an intermediate value, said intermediate value being greater than or equal to said first and second values and defines a peak value for each of said feasible series; and
   classifier means for comparing said digital series from said signal processing means to the collection of predetermined feasible series in the storage means, said classifier means generating an output indicating the input signal is of high interest if the digital series is included in the collection of predetermined digital series or an output indicating the input signal is of low interest if the digital series in not included in the collection of predetermined digital series.

* * * * *